United States Patent
Kobayashi

(10) Patent No.: US 6,266,455 B1
(45) Date of Patent: Jul. 24, 2001

(54) IMAGE PROCESSOR

(75) Inventor: Kazumi Kobayashi, Tokyo (JP)

(73) Assignee: Copyer Co. Ltd., Tokyo (JP)

( * ) Notice: Subject to any disclaimer, the term of this patent is extended or adjusted under 35 U.S.C. 154(b) by 0 days.

(21) Appl. No.: 09/142,264

(22) PCT Filed: Mar. 4, 1997

(86) PCT No.: PCT/JP97/00648

§ 371 Date: Sep. 2, 1998

§ 102(e) Date: Sep. 2, 1998

(87) PCT Pub. No.: WO97/33219

PCT Pub. Date: Sep. 12, 1997

(30) Foreign Application Priority Data

Mar. 4, 1996 (JP) .................................................. 8-046475

(51) Int. Cl.⁷ ........................................................ G06K 9/54
(52) U.S. Cl. ........................... 382/307; 358/1.13; 358/1.3; 358/1.18
(58) Field of Search ................................... 382/307, 305, 382/232, 199, 242; 395/103, 114, 115; 345/135, 443; 358/1.13, 1.16, 1.3, 1.6, 1.18; 347/1, 116

(56) References Cited

U.S. PATENT DOCUMENTS

| | | | |
|---|---|---|---|
| 4,254,467 | * 3/1981 | Davis et al. | 364/521 |
| 4,458,330 | * 7/1984 | Imsand et al. | 364/900 |
| 4,951,228 | * 8/1990 | Hiwawa et al. | 364/520 |
| 5,028,848 | * 7/1991 | Bankston et al. | 315/364 |
| 5,396,582 | * 3/1995 | Kahkoska | 395/103 |
| 5,680,521 | * 10/1997 | Pardo et al. | 395/112 |
| 5,852,710 | * 12/1998 | Shiohara et al. | 395/115 |

FOREIGN PATENT DOCUMENTS

| | | |
|---|---|---|
| 1-217621 | 8/1989 | (JP) . |
| 5-24301 | 2/1993 | (JP) . |
| 6-171160 | 6/1994 | (JP) . |

* cited by examiner

Primary Examiner—Leo Boudreau
Assistant Examiner—Kanji Patel
(74) Attorney, Agent, or Firm—Dellett and Walters

(57) ABSTRACT

A data communication unit (1) receives input image data of a first data format which comprises coordinate data of the end points of vectors forming an image and various modifying information of the vectors, and stores them in an input buffer (2). A data analyzer unit (3) converts the input image data into image data of a second data format and stores the data in a storage unit (6). The second data format holds the various modifying information independently of the coordinate data of the end points, decreasing the amount of data compared with the first data format. Based on the image data of the second data format, the data analyzer unit (3) generates, in a band-by-band manner, intermediate codes comprising coordinate data that constitute the contours of the vectors reflecting the various modifying information. The intermediate codes are converted into corresponding raster data in a band-by-band manner, and are printed as an image by a printer unit (10).

14 Claims, 16 Drawing Sheets

F I G. 5

| DATA | BINARY NOTATION | SYMBOL | MEANING |
|---|---|---|---|
| <COORDINATE DATA> | 0sxxxxxx | — | S: SIGN BIT |
| <INDEX DATA> | 10000000 | A1 | FOLLOWED BY <ABSOLUTE COORDINATE DATA> OF 1 BYTE |
| <INDEX DATA> | 10000001 | A2 | FOLLOWED BY <ABSOLUTE COORDINATE DATA> OF 2 BYTES |
| <INDEX DATA> | 10000010 | A3 | FOLLOWED BY <ABSOLUTE COORDINATE DATA> OF 3 BYTES |
| <INDEX DATA> | 10000011 | A4 | FOLLOWED BY <ABSOLUTE COORDINATE DATA> OF 4 BYTES |
| <INDEX DATA> | 10000100 | A5 | FOLLOWED BY <ABSOLUTE COORDINATE DATA> OF 5 BYTES |
| <INDEX DATA> | 10001000 | R1 | FOLLOWED BY <RELATIVE COORDINATE DATA> OF 1 BYTE |
| <INDEX DATA> | 10001001 | R2 | FOLLOWED BY <RELATIVE COORDINATE DATA> OF 2 BYTES |
| <INDEX DATA> | 10001010 | R3 | FOLLOWED BY <RELATIVE COORDINATE DATA> OF 3 BYTES |
| <INDEX DATA> | 10001011 | R4 | FOLLOWED BY <RELATIVE COORDINATE DATA> OF 4 BYTES |
| <INDEX DATA> | 10001100 | R5 | FOLLOWED BY <RELATIVE COORDINATE DATA> OF 5 BYTES |
| <INDEX DATA> | 10010000 | AT | FOLLOWED BY <PEN ATTRIBUTE DATA> OF FIXED LENGTH |
| <INDEX DATA> | 10100000 | FH | FOLLOWED BY <FILE HEADER> OF FIXED LENGTH |
| <INDEX DATA> | 11000000 | IS | FOLLOWED BY <IMAGE SIZE DATA> OF FIXED LENGTH |

FIG. 6

| INTEGER DATA | | RANGE |
|---|---|---|
| 1-BYTE INTEGER | 7-BIT INTEGER | −64 ~ +63 |
| 2-BYTE INTEGER | 15-BIT INTEGER | −16,384 ~ +16,383 |
| 3-BYTE INTEGER | 23-BIT INTEGER | −4,194,304 ~ +4,194,303 |
| 4-BYTE INTEGER | 31-BIT INTEGER | −1,073,741,824 ~ +1,073,741,823 |
| 5-BYTE INTEGER | 32-BIT INTEGER | −2,147,483,648 ~ +2,147,483,647 |

F I G. 7

| INTEGER DATA | LITTLE-ENDIAN | BIG-ENDIAN | PRE-DISPLAY LIST |
|---|---|---|---|
| −32 (0xffffffe0) | e0 ff ff ff | ff ff ff e0 | 60 |
| +53 (0x00000035) | 35 00 00 00 | 00 00 00 35 | 35 |
| −12,453 (0xffffcf5b) | 5b cf ff ff | ff ff cf 5b | 4f 5b |
| +15,396 (0x00003c24) | 24 3c 00 00 | 00 00 3c 24 | 3c 24 |
| −2,987,371 (0xffd26a95) | 95 6a d2 ff | ff d2 6a 95 | 52 6a 95 |
| +3,618,263 (0x003735d7) | d7 35 37 00 | 00 37 35 d7 | 37 35 d7 |
| −1,009,348,557 (0xc3d69033) | 33 90 d6 c3 | c3 d6 90 33 | 43 d6 90 33 |
| +1,053,226,213 (0x3ec6f4e5) | e5 f4 c6 3e | 3e c6 f4 e5 | 3e c6 f4 e5 |
| −2,118,973,007 (0x81b309b1) | b1 09 b3 81 | 81 b3 09 b1 | 7f 81 b3 09 b1 |
| +1,953,472,524 (0x746fa00c) | 0c a0 6f 74 | 74 6f a0 0c | 00 74 6f a0 0c |

PEN ATTRIBUTE 412

| penNumber | penWidth | lineEnds | lineJoin | fillType | ... |

4121　　4122　　4123　　4124　　4125

| No. | NAME OF VARIABLE | CONTENTS | NUMBER OF BITS |
|---|---|---|---|
| 1 | penNumber | PEN NUMBER | 6 |
| 2 | penWidth | PEN WIDTH | 3 2 |
| 3 | lineEnds | LINE TERMINATION TYPE | 3 |
| 4 | lineJoin | LINE JOIN TYPE | 3 |
| 5 | fillType | FILL TYPE | 9 |
| ⋮ | ⋮ | ⋮ | ⋮ |

INTERMEDIATE CODE FORMAT

| 161 | 162 | 163 — FOUR COORDINATES OF 1-ST SEGMENT | | | |
|---|---|---|---|---|---|
| BAND#1 | NUMBER OF SEGMENTS (n) | x11,y11 | x12,y12 | x13,y13 | x14,y14 |

FOUR COORDINATES OF 2-ND SEGMENT

| x21,y21 | x22,y22 | x23,y23 | x24,y24 |
|---|---|---|---|

⋮

FOUR COORDINATES OF n-TH SEGMENT

| xn1,yn1 | xn2,yn2 | xn3,yn3 | xn4,yn4 |
|---|---|---|---|

FOUR COORDINATES OF 1-ST SEGMENT

| BAND#2 | NUMBER OF SEGMENTS (p) | x11,y11 | x12,y12 | x13,y13 | x14,y14 |
|---|---|---|---|---|---|

FOUR COORDINATES OF 2-ND SEGMENT

| x21,y21 | x22,y22 | x23,y23 | x24,y24 |
|---|---|---|---|

⋮

FOUR COORDINATES OF p-TH SEGMENT

| xp1,yp1 | xp2,yp2 | xp3,yp3 | xp4,yp4 |
|---|---|---|---|

⋮

FOUR COORDINATES OF 1-ST SEGMENT

| BAND#m | NUMBER OF SEGMENTS (q) | x11,y11 | x12,y12 | x13,y13 | x14,y14 |
|---|---|---|---|---|---|

FOUR COORDINATES OF 2-ND SEGMENT

| x21,y21 | x22,y22 | x23,y23 | x24,y24 |
|---|---|---|---|

⋮

FOUR COORDINATES OF q-TH SEGMENT

| xq1,yq1 | xq2,yq2 | xq3,yq3 | xq4,yq4 |
|---|---|---|---|

FIG. 16

INIT;PENW1,5;PENW2,10;SPEN1;PMOV1000,1000;PNDN;
PMOV2000,2000;PMOV1000,2000;PNUP;SPEN2;
PMOV2000,1000;PNDN;PMOV3000,1000;PMOV3000,
2000;PNUP;PMOV4000,4000;PNDN;CIRC800;PNUP;DEND;

FIG. 17

| | |
|---|---|
| INIT; | : INITIALIZING COMMAND |
| PENW(pen number),(pen width) | |
| | : PEN WIDTH DESIGNATING COMMAND |
| SPEN(pen number) | : DRAWING PEN DESIGNATING COMMAND |
| PNDN; | : PEN DOWN COMMAND |
| PNUP; | : PEN UP COMMAND |
| PMOV(x coordinate),(Y coordinate); | |
| | : PEN MOVING COMMAND |
| CIRC;(radius),(angle); | |
| | : CIRCLE DRAWING COMMAND |
| DEND; | : DATA ENDING COMMAND |

VIRTUAL PAPER SHEET

IMAGE PROCESSOR

TECHNICAL FIELD

The present invention relates to an image processor suitable for use in a plotter apparatus, a printer apparatus or the like which acts to convert vector data into corresponding raster data, for respective unit regions of an image, and more particularly to an image processor which converts the vector data into intermediate codes.

BACKGROUND ART

A raster-type plotter apparatus has heretofore been known which performs a printing with a full bit-map system for converting one page (or plural pages) of whole input image data into raster data so as to develop the converted data in a memory.

This full bit-map system needs a large storage capacity of the memory because it must develop one page (or plural pages) of raster data in the memory. Specifically, a raster-type plotter apparatus employing 128 heads with nozzles of 360 dpi (the number of dots per inch (25.4 mm)) capable of plotting A0 size (W×L: 841 mm×1,189 mm), needs to have 186 (Kbytes)×1189 (mm)/25.4 (mm)÷128/360=about 24 Mbytes of the storage capacity of the memory for developing therein one page of input image data into raster data. The "186 (Kbytes)" is a necessary storage capacity for the memory to develop, therein, one band portion of the input image data into the raster data.

In such raster plotter apparatuses with the full bit-map system, the need of the large storage capacity for the memory has increased the cost of the plotter apparatus.

On the other hand, raster-type plotter apparatuses employing a banding processing have also been known. The banding processing is mainly used for such plotter apparatuses as having a moving carriage on which recording heads are mounted, wherein the input image data are converted into intermediate codes per region of a determined unit (for example per band) and the converted intermediate codes are then converted into the raster data. Here, the "band" is referred to as a strip region which is recorded in one scanning of the heads.

In order to produce data of one vector, it is necessary to define two end points (head and tail end points) of the vector as well as modifying information of the vector (i.e., plotter parameters) including line length, line width, shape of the line ends, and the like, as shown in FIG. 8. Thus, the raster-type plotter apparatus using the banding processing, first, converts the raster data, which are defined by the head and tail end points as shown in FIG. 9, with various modifying information added, into the intermediate codes of a so-called display list and, then, performs a vector-to-raster conversion (VRC) with respect to the intermediate codes. The intermediate codes are data of a format which is adapted for use in the vector-to-raster conversion, and comprises coordinate data, which constitute respective contours of the vectors, on which the modifying information has been reflected, band by band, based on the vector data of the input image data. Incidentally, the intermediate codes will be described below more in detail.

Thus, by converting the intermediate codes, which are produced prior to the printing, into the raster data in a band-by-band manner, it is possible to avoid the inconvenience of developing the incoming image data as a whole in a memory as in the full bit-map raster-type plotter apparatus mentioned above, to thereby reduce the necessary capacity of the memory.

More specifically, in a raster-type plotter apparatus employing 128 heads with nozzles of 360 dpi capable of plotting A0 size, the necessary storage capacity of the memory for developing one band portion of the input image data into the raster data is:

841 (mm)/25.4 (mm)×360 (dpi)×128=about 186 KBytes the capacity of the storage is drastically reduced as compared to that of aforementioned raster-type plotter apparatus employing the full bit-map system.

Such a raster-type plotter apparatus employing the banding processing is supposed to use the intermediate codes when re-plotting the data which were plotted previously, and such intermediate codes have been produced in the form of coordinate data on which the modifying information has been reflected. For this reason, it is difficult to perform, afterward, additional processing such as rotation, enlargement, reduction, and change of line width.

Incidentally, it is possible to re-produce the intermediate codes, after changing respective plotting parameters, with respect to partial input image data for each band, by increasing the capacity of an input buffer memory, which temporarily stores the input image data, so as to utilize the data stored in the input buffer memory. However, in order to accomplish this, the input buffer memory needs a large storage capacity, suffering from problems in mounting parts and in cost of the raster-type plotter apparatus, and hence this approach is not practical.

Further, another prior art apparatus has been known which includes means for relocate images for elimination of wasting papers when a plurality of separate images are recorded on the same paper. Instead of placing plural images vertically along a long paper sheet in the order of receiving the images as shown in FIG. 19(a), the image relocation means relocates the images as shown in FIG. 19(b). Conventionally, such relocation of the images is performed, when converting the input image data into the intermediate codes, by determining the positions of the relocation, taking into consideration the sizes of the respective images of the input image data, which are to be formed on an actual paper sheet.

However, this approach requires that the size of the actual paper sheet and the sizes of respective images should be settled prior to the conversion of the input image data into the intermediate codes. For this reason, the size of the actual paper sheet must be known based on a user's instruction or information given from a print engine 26. Also, regarding the image size, it is required that each image size should explicitly be specified in the form of a data header or the like, or a user's explicit instruction, prior to the initiation of the image data input. Therefore, if, during plot of an image, next image data are inputted for which the size of a paper sheet to be supplied is unsettled, the intermediate codes for the input image data are not produced, making an idle time in a CPU operation, which causes a problem in efficiently using the CPU.

In view of the foregoing problems, an object of the present invention is to provide an image processor which converts input image data into raster data without having a memory of a large storage capacity for bit-map development and makes it possible to change modifying information prior to the plotting without having an input buffer memory of a large storage capacity.

Another object of the present invention is to provide an image processor which effectively uses a CPU which can analyze input image data even when the size of a paper sheet for plotting is not settled in advance.

DISCLOSURE OF THE INVENTION

According to the present invention, there is provided an image processor for forming an image in a band-by-band manner, comprising: a data format conversion unit for converting input image data of a first data format into image data of a second data format, the input data of the first data format including coordinate data of end points of respective vectors constituting an image and various modifying information, and the second data format reducing data amount compared to the first data format; a storage unit for storing an entirety of the image data of the second data format obtained by the data format conversion unit; an intermediate code production unit for producing intermediate codes, which include coordinate data constituting contours of the respective vectors on which the various modifying information has been reflected, in the band-by-band manner, based on the image data of the second data format; and a raster data production unit for converting, in the band-by-band manner, the intermediate codes into corresponding raster data.

More specifically, the image processor converts vector data, which are input image data of the first data format, into image data (i.e., pre-intermediate codes) of the second data format being different from the first data format, thereby storing the image data of the second data format in the form of vector data added with the various modifying information (e.g., a line width, shape of end points of a line, etc.), before the modifying information are settled in the intermediate codes.

Preferably, in the second data format, a group of vectors connected in series are defined by coordinate data of the end points of the vectors, and wherein only a head end point of the first one of the vectors is represented by absolute coordinates while the rest of the end points of the vectors are represented by relative coordinates.

Also, preferably, the coordinate data of the second data format may be data of variable length, the coordinate data of each coordinate point being added, at a head thereof, with index data of a fixed length which indicate a data length of the coordinate data and whether the coordinate is absolute or relative coordinate. In this case, when a plurality of coordinate data of the same type successively appear, the index data may be omitted with respect to the second and the following coordinate data of the plurality of coordinate data.

In the second data format, the coordinate data and the index data may be distinguished from each other by a head bit of unit data of a predetermined plurality of bits.

In the second data format, the various modifying information includes pen attribute data of a fixed length, at the head of which another index data of a fixed length is also added for distinguishing the same. The pen attribute data may preferably be added only to the coordinate data of a vector whose modifying information are different from that of a previous vector.

With such configuration of the second data format, data amount is usually reduced (compressed) in the image data in the second data format as compared to the image data of the first data format. Accordingly, the storage capacity of the storage means necessary for storing the image data of the second data format (pre-intermediate codes) can be reduced.

The intermediate code production unit may comprise a unit for using a user-specified modifying information in preference to the various modifying information of the image data of the second data format, according to a user's instruction, when producing the intermediate codes on the basis of the image data of the second data format.

Alternatively, the image processor may comprise a unit for changing a piece of modifying information specified by a user among the various modifying information placed in the image data of the second data format which are stored in the storage unit.

The image processor may further comprise a unit for determining positions and orientations of a plurality of images on a paper sheet, when the intermediate code production unit produces the intermediate codes on the basis of the image data of the second data format. In this case, preferably, the data format conversion unit detects the size of an input image, based on the input image data, to put image size data indicating the detected size into the image data of the second data format, and wherein the unit for determining positions and orientations makes the determination with reference to the image size data.

The image processor may further comprise a unit for enlarging/reducing an image, when the intermediate code production unit produces the intermediate codes on the basis of the image data of the second data format.

According to the invention, by storing the pre-intermediate codes, in which the modifying information has not been settled, in the storage unit, it is possible to readily change the modifying information and relocate the images using such various units.

For example, it is possible to print an image at an arbitrary position on a paper sheet by transforming coordinate values when converting the pre-intermediate codes into the intermediate codes. Thus, in a case where a plurality of images of, e.g., A4 size are to be printed on A0-size roll paper, the images can be placed at arbitrary positions on the paper, based on the pre-intermediate codes.

In addition, by setting up a virtual paper size, used in a layout display or plotting to be a predetermined large size, it is possible to analyze the input image data, even when the paper size to be actually set-up is not known beforehand. Since the alternation of the modifying information can be performed to the pre-intermediate codes, an image of a size adapted to the actual paper sheet size can be plotted in converting the pre-intermediate codes into the intermediate codes. Also, when a possibility for data to be transmitted successively is high as in the case of using roll paper as the plot paper or using a cut sheet feeder, even if the paper size actually set is changed, it is possible to analyze the input image data beforehand based on the pre-intermediate codes by using the time during which the CPU load is not high. Thus, the CPU can efficiently be used.

In the layout display, after being subject to the alteration of the various modifying information and addition of layout information, the pre-intermediate codes can be converted into raster data to be displayed on the monitor. Therefore, it is possible to add further modifications while viewing the layout display on the monitor, to be sure to realize a desired state of the image.

BRIEF DESCRIPTION OF THE DRAWINGS

FIG. 5 illustrates a data structure of index data and coordinate data which constitute the pre-intermediate codes;

FIG. 6 illustrates integer data used in the pre-intermediate codes;

FIG. 7 shows an example in which the integer data of FIG. 6 have been converted into the pre-intermediate codes;

FIG. 15 shows a format of the intermediate codes in the embodiment;

FIG. 16 shows an example of input image data in the embodiment;

FIG. 17 illustrates commands which are used in the input image data shown in FIG. 16;

DESCRIPTION OF THE PREFERRED EMBODIMENTS

A detailed description will subsequently be given of an embodiment of the image processor according to the present invention by reference to the accompanying drawings.

The image processor according to the present embodiment is used for an ink-jet recording plotter apparatus with a carriage, which is scanned, having ink jet recording heads mounted thereon.

Figure 1:
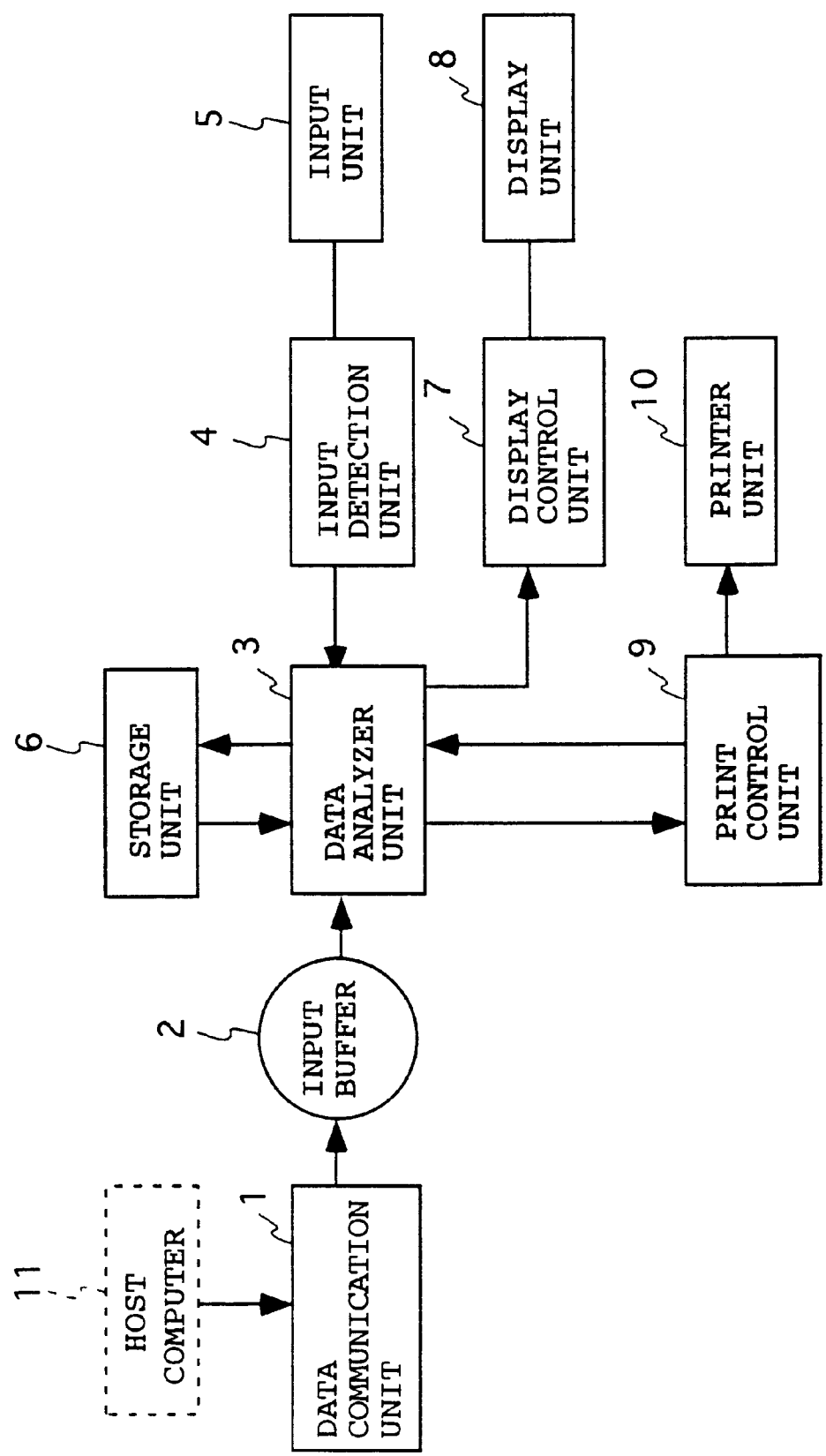
FIG. 1 is a block diagram of an embodiment in which an image processor of the present invention is applied to a plotter apparatus.

As shown in FIG. 1, this plotter apparatus comprises a data communication unit 1 for receiving input image data from an upper device or host computer 11, an input buffer memory 2 which is a ring buffer for temporarily storing input image data received from the data communication unit 1, a data analyzer unit 3 for controlling the entirety of this plotter apparatus, an input unit 5 including an operation panel of the plotter apparatus for accepting various modifying information, and an input detection unit 4 for detecting the various modifying information from the input unit 5 and for forwarding the same to the data analyzer unit 3.

The plotter apparatus further comprises a storage unit 6 for storing a control program of the present apparatus, pre-intermediate codes, intermediate codes, modifying information, etc., a display unit 8 which displays images to be plotted in advance, in order to confirm the layout of the images, a display controller 7 for controlling the display of the images of the display unit 8, a printer unit 10 for plotting an image according to the input image data, and a print controller 9 for controlling the plotting of the printer unit 10. The storage unit 6, for an example, comprises a semiconductor memory, a magneto-optic disc, a magnetic disc (including a floppy disc, a hard disc, etc.) and the like.

Figure 2:
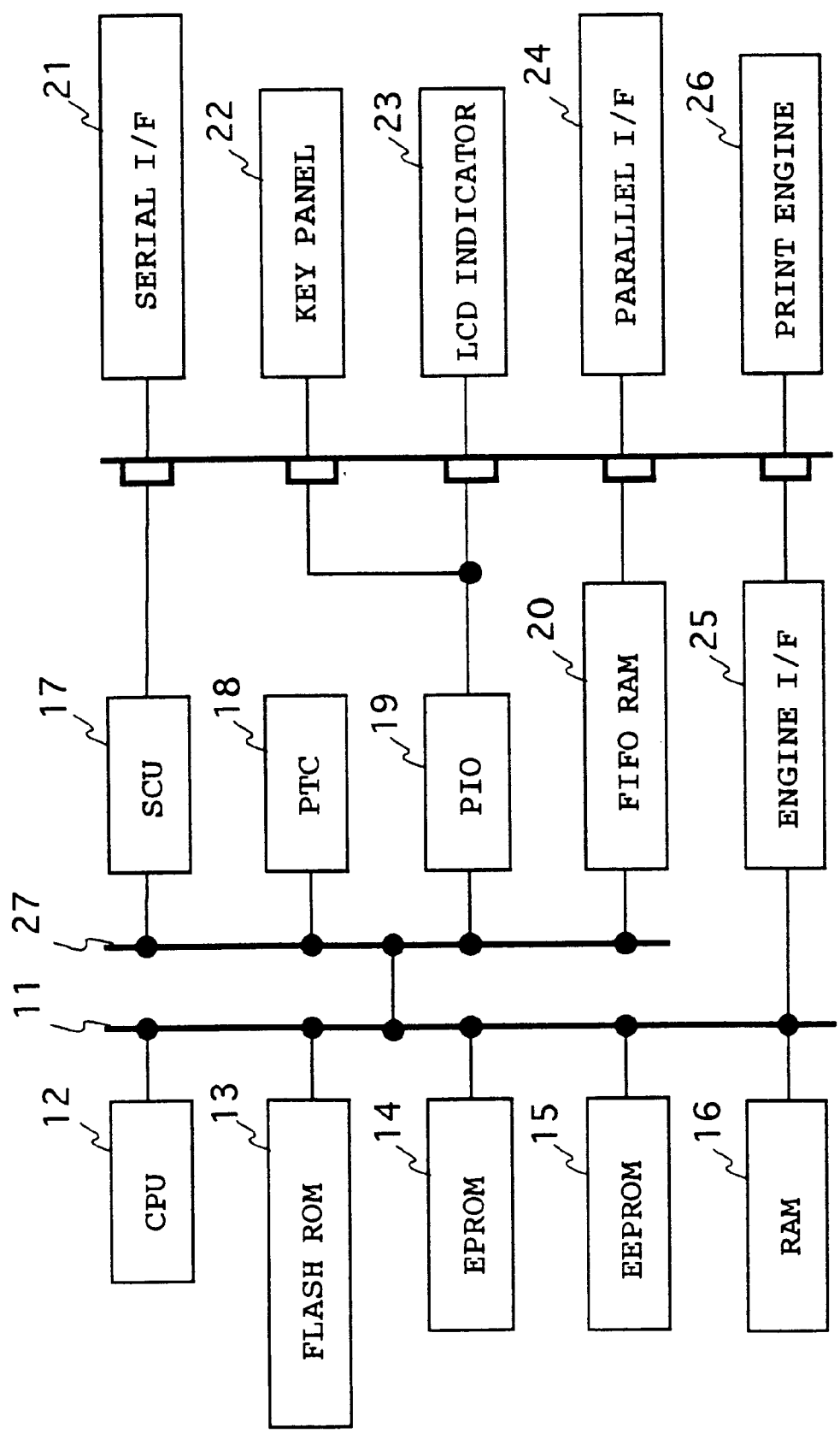
FIG. 2 is a block diagram showing a hardware configuration using a CPU for the plotter apparatus according to the embodiment.

More specifically, FIG. 2 shows a hardware configuration in which a central processing unit (CPU) is used to realize mainly the function of the data analyzer unit 3 and the controlling function of the whole apparatus which is shown in FIG. 1.

That is, in FIG. 2, a CPU bus line 11 is connected with the CPU 12, a FlashROM 13 for storing the program, an EPROM 14 for storing several types of fonts and a boot program, an EEPROM 15 for storing various modifying information given by a user, a RAM 16 to be used as the input buffer memory 2 and a work area, an engine interface (engine I/F) unit 25 for communicating with a print engine 26, and an I/O bus line 27. The print engine 26 and the engine I/F unit 25 correspond respectively to the print controller 9 and the printer unit 10 as shown in FIG. 1.

Also, connected with the I/O bus line 27 are an SCU (Serial Communication Unit) 17, a PTC (Programmable Timer Controller) unit 18 for interrupt processing, timer processing, or the like, a PIO (Programmable IO) unit 19, and an FIFORAM 20. The SCU 17 is connected with a serial interface (Serial I/F) unit 21 and the PIO unit 19 is connected with a key panel 22 and an LCD indicator 23. The key panel 22 corresponds to the input unit 5 in FIG. 1 and the LCD indicator 23 to the display unit 8 in FIG. 1. Also, the FIFORAM 20 is connected with a parallel interface (Parallel I/F) unit 24. The serial I/F unit 21 or parallel I/F unit 24 constitutes the data communication unit 1 aforementioned with reference to FIG. 1.

In the plotter apparatus of the embodiment having such a configuration, the CPU 12 controls respective units according to the program which is stored in any of the FlashROM 13, the EPROM 14, the EEPROM 15, and the RAM 16 (these corresponding to the storage unit 6).

Figure 3:
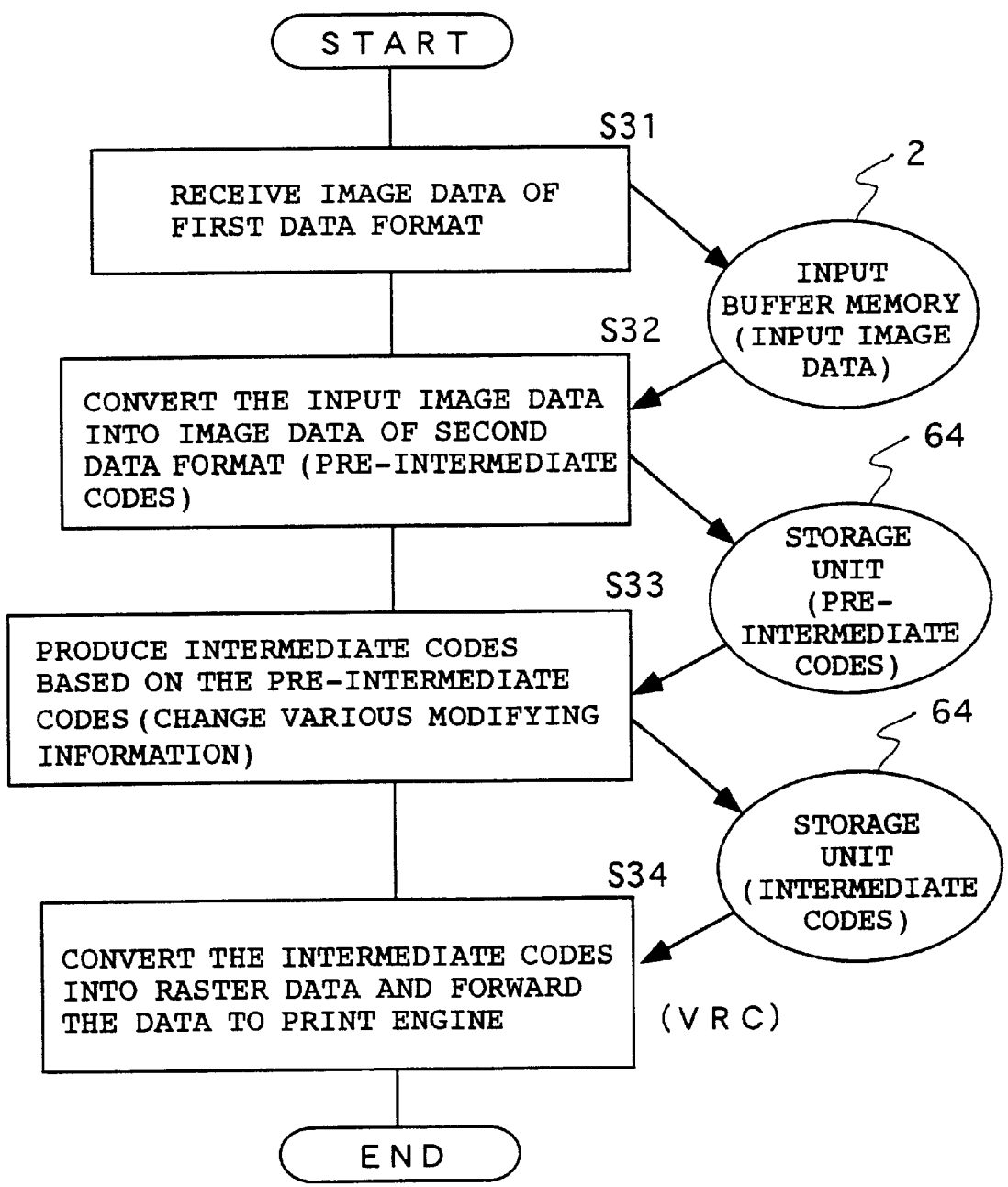
FIG. 3 is a flow chart showing a conversion process in which vector data are converted into corresponding raster data in the plotter apparatus of the embodiment.

The conversion process of vector data to raster data according to the plotter apparatus is as shown in FIG. 3.

The data communication unit 1 receives vector data as input image data (S31). The received data is temporarily stored in the input buffer memory 2. Then, the data analyzer unit 3 reads out the input image data stored in the input buffer memory 2 and obtains the end points (head and tail end points) of each line segment (vector) contained in such input image data to convert the same into a format of pre-intermediate codes mentioned below, which are the image data of a second data format, together with modifying information associated with each line segment (S32). All the pre-intermediate codes obtained by this conversion are stored in the storage unit 64. The storage capacity of the input buffer memory 2 is sufficient with the size corresponding to a part of an entire image because the processing of inputting the image data into the buffer memory 2 is performed in parallel with the conversion of the data format of the input image data which stored in the input buffer memory 2.

Next, based on the pre-intermediate codes stored in the storage unit 64, the data analyzer unit 3 produces the corresponding intermediate codes, as shown in FIG. 3 (S33). That is, the pre-intermediate codes are converted into the intermediate codes. These intermediate codes are also stored in another area of the storage unit 64. The intermediate codes of an entire input image can be stored, or alternatively, a required amount thereof for a subsequent VCR processing may be stored temporarily. The values of coordinates used in the intermediate codes employs the unit system of printed dots for an actual printing. Specifically, the coordinate system of 1/360 inch, which is equal to a unit of the resolution of the recording head, is used. Then, the modifying information, the reflection of which has been suspended up to with the pre-intermediate codes, is reflected to each line segment. That is, coordinates of the contours of each line segment to be actually printed are calculated in a band-by-band manner, based on the coordinate values of the vector data.

In converting the pre-intermediate codes into the intermediate codes, it is possible for a user to change the modifying information of each vector (i.e., actually modifying information of a virtual pen to draw the vector with) or to change the size of a paper sheet. Also, in the event of re-plotting, re-analysis of the pre-intermediate codes allows the foregoing various modification, thereby obtaining a new image at a high speed.

Further, the data analyzer unit 3 converts these intermediate codes thus obtained into raster data to supply the same to the print engine 26 (S34).

In the data format of the pre-intermediate codes, the information of line segments and their corresponding modifying information still exist independently of each other. That is, the modifying information has not yet been reflected to the coordinate data of the line segments, and the modifying information is in a state capable of being changed independently of the line segments. Also, as mentioned below, the second data format is reduced (compressed) in the amount of the whole image data as compared to the first data format.

When it is desired to confirm a plotted result in advance, a user inputs an instruction to present a layout display, with the input unit 5 as shown FIG. 1. Upon receipt of the instruction for the layout display, the data analyzer unit 3 detects the command through the input detection unit 4 and reads the pre-intermediate codes of a specified image, stored in the storage unit 6. Then, the data analyzer unit 3 converts the pre-intermediate codes into intermediate codes and then into raster data, so as to apply the raster data through the display controller 7 to the display unit 8, such as a monitor device. Thus, the image specified by the user can be layout-displayed on the display unit 8.

Next, the user views the image displayed to check the plotted state prior to an actual plotting. If it is desired to change the modifying information, the user operates the input unit 5 to input modifying information to make the change (including delete or addition). The input modifying information is applied through the input detection unit 4 to the data analyzer unit 3.

Upon receipt of the changed modifying information, the data analyzer unit 3 issues an instruction to change the modifying information which is stored in the storage unit 6. The thus changed contents are then stored, for example, in the EEPROM 115. According to the condition previously set by the user, the data analyzer unit 3 preferentially uses such changed modifying information for the conversion of the pre-intermediate codes into the intermediate codes so as to convert them into raster data which are in turn applied to the display unit 8. Thus, the image corresponding to the modifying information that has been changed by the user can be displayed on the monitor.

When the image displayed on the display unit is satisfactory, the user operates the input unit 5 to start a plotting. Then, upon detection of the user's operation, the data analyzer unit 3 reads the pre-intermediate codes, which corresponds to the image currently layout-displayed, out of the storage unit 6, so as to convert them into the intermediate codes and then into the raster data to be applied to the printer unit 10, as previously explained. Thus, the image corresponding to the modifying information that has been changed by the user can be plotted. Incidentally, when entire intermediate codes has been stored, the plot can be performed based on such intermediate codes.

In this way, the present plotter apparatus converts vector data into pre-intermediate codes, which are vector data with unsettled modifying information, before converting the vector data into intermediate codes, and stores the pre-intermediate codes in the storage unit 6. This allows change of the modifying information stored in the storage unit 6 even after converting the vector data into raster data, thereby facilitating the alteration of the modifying information.

Now, an explanation will be given of, first, the input image data and intermediate codes for a plotter which are supposed in this embodiment, and then of the pre-intermediate codes, although this is not the same as the order of the processes in FIG. 3.

Referring to FIG. 16, there is shown an example of the input image data which are supposed in the present embodiment. This is the data including commands and coordinate data which are to be applied to the plotter, for example, constituted by a string of character codes as the ASCII codes. The each digit number such as "0", "1", and "2" in the coordinate data (1000, 2000) is also represented by a character code of one byte. According to the present embodiment, each coordinate data of the input image data are represented by four bytes Referring to FIG. 17, there is shown an embodiment of the commands used in the exemplary data in FIG. 16.

"INIT;" is a initializing command which is outputted at the beginning of a transmission of image data.

"PENW (pen number), (pen width);" is a pen width designating command for designating a pen width (pen thickness) for each of a plurality of pens (virtually prepared pens in the ink-jet recording).

"SPEN (pen number);" is a drawing pen designating command for designating a pen to be used from now on.

"PNDN;" is a pen down command for the pen designated by the drawing pen designating command, to press it down to the paper.

"PNUP;" is a pen up command which instructs an operation opposite to the pen down command.

"PMOV (X coordinate), (Y coordinate);" is a pen moving command to linearly move the designated pen to the position indicated by the X coordinate and Y coordinate from the current position. In this pen movement, when the pen is down a line is drawn, and when the pen is up only the current position is changed without any drawing.

"CIRC (radius), (angle);" is a circle drawing command for drawing a circle of the designated radius with the current position used as its center, by substituting lines for arcs at intervals of a designated angle. In the case of omitting the angle, a predetermined angle (e.g., 5 degrees) is used as a default value.

"DEND;" is a data ending command for indicating the termination of the input image data.

In the example shown in FIG. 16, first, the pen widths of the pens 1 and 2 are set respectively to "5" and "10", and the pen 1 is moved to a coordinate point (1000, 1000). Then, the pen 1 is moved to a coordinate point (2000, 2000) with the pen pressed down, and then the pen is pulled up. Next, the pen 2 is designated and moved to a coordinate point (2000, 1000). Then, the pen 2 is pressed down and moved to a coordinate point (3000, 1000). Then, the pen 2 is further moved to a coordinate point (3000, 2000) with the pen 2 kept down, and after this, the pen 2 is pulled up. Further, the pen 2 is moved to a coordinate point (4000, 4000). Then, the pen 2 is pressed down to draw a circle with a radius "800". Finally, the pen 2 is pulled up to complete this drawing work.

Figure 18:
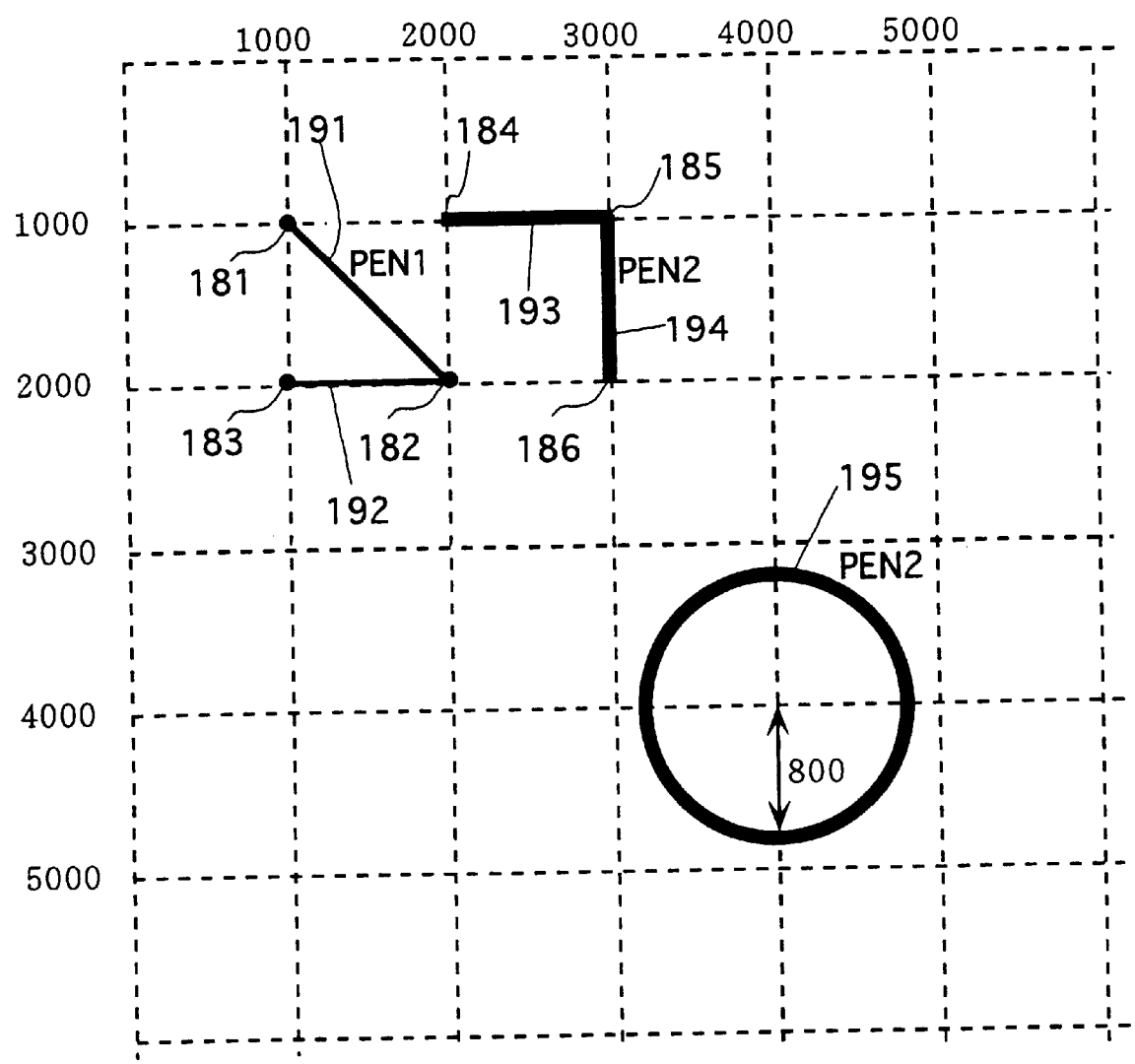
FIG. 18 shows a plotted result which is obtained according to the input image data of FIG. 16.

FIG. 18 shows the resultant image drawn in this way. It is seen from the drawing that the pens 1 and 2 are different in their pen width.

In the example shown in FIG. 16, only the pen width is used as the pen attribute, various other modifying information may be used in an actual case.

Figures 13, 14:
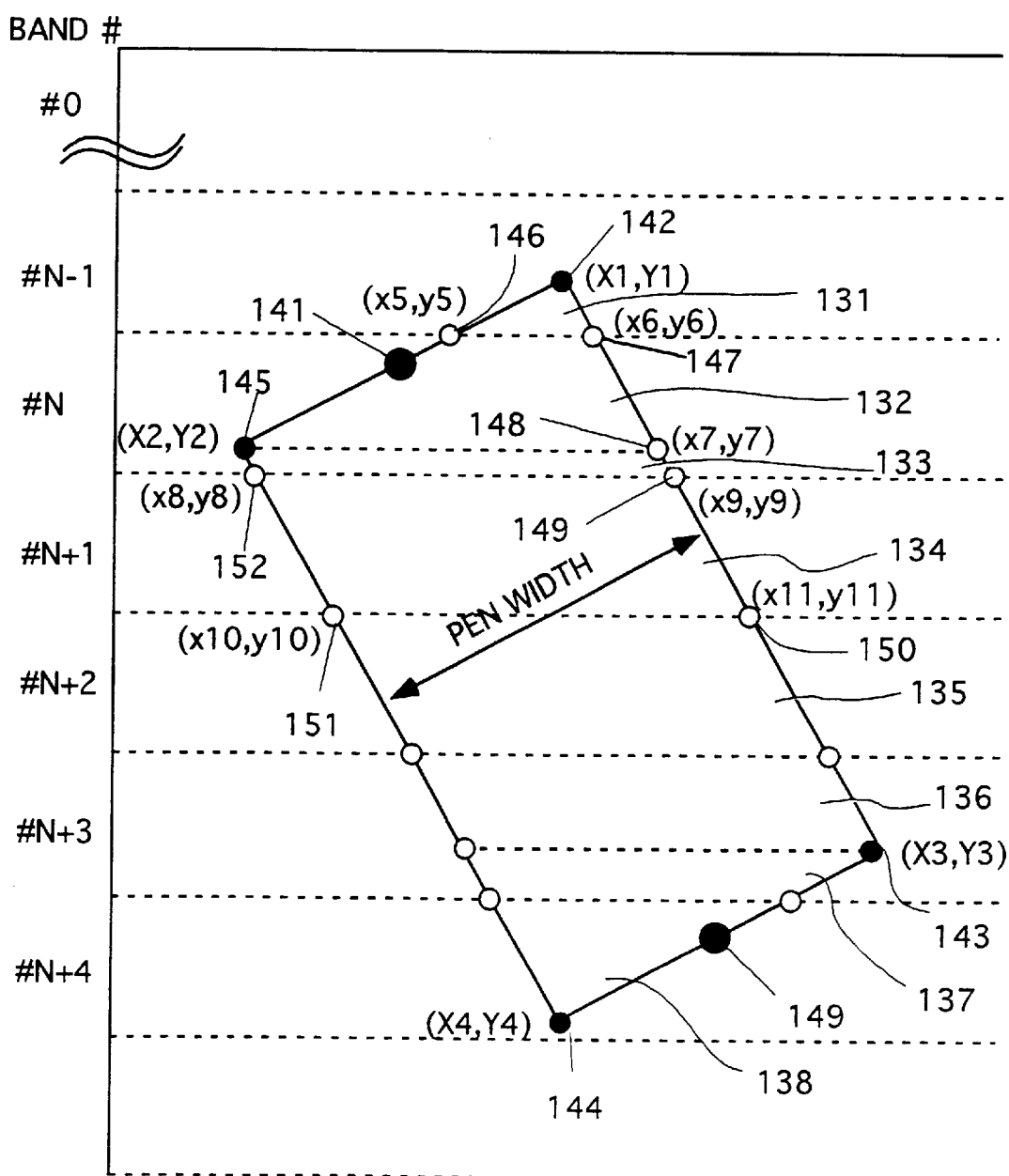
FIG. 13 shows an example of the intermediate codes used in the embodiment.
FIG. 14 is a diagram for illustrating the data sequences of the intermediate codes shown in FIG. 13.

Referring next to FIGS. 13, 14 and 15, an explanation will be given of a specific structure of the intermediate codes.

FIG. 13 shows specific exemplary data of the intermediate codes. The intermediate codes comprise, for each band, a band No. (N−1, N, N+1, . . . ), the number (1, 2, or the like) of horizontal segments of the contour (or outline) of each vector contained in the band, and the coordinate data ((X1, Y1), (x6, y6), . . . ) of each segment.

FIG. 14 shows the correlation between the data shown in FIG. 13 and the coordinate points on a paper sheet. This is an example in which a vector defined by end point 141 and 149 is plotted with a width W. It should, however, be noted that the pen width W is exaggerated in the figure.

As seen from FIGS. 13 and 14, the intermediate codes contain coordinate point data which define the vector contour on which the modifying information, such as the line width, has been reflected. More specifically, the coordinate data are given by selecting characteristic points on the vector contour for each band. The vector contour for each band is divided into one or more of the "horizontal segment". Each horizontal segment is formed basically with a tetragon defined by four vertices. For the triangle segment as segment 131 or 138 shown in FIG. 14, one of the vertices is duplicated in describing the segment. It is seen from the example in FIG. 13 that with respect to horizontal segment 131, one of the vertices, the coordinate point (x6, y6), is doubled in the description.

Since the intermediate codes comprise a set of such tetragons, four vertices of each tetragon constitute a unit of data. One coordinate point data consist of x-coordinate and y-coordinate, and hence defined by eight values in total. (The data unit formed by these eight values is referred to as 1 DL (Display List)). Therefore, the intermediate codes can be said to be sequential data in which a set of a band No., the number of DLs within the band and DL data of the band on an actual paper sheet is repeatedly described for the number of the bands on the actual paper sheet.

In the example shown in FIG. 14, the whole contour of the vector is defined by respective four vertices of eight horizontal segments 131–138. The coordinate points 142–145 (shown as black dots) with capital letters X and Y are the four coordinate points to define the contour of the vector on which the line width has been reflected, and coordinate points 146–152 (shown as white dots) with small letter x and y are the coordinate points that have been produced by the banding processing.

In this way, the coordinate data of the intermediate codes 13 are in a form in which the modifying information of the vector have been reflected. It will be understood that it is more difficult to change the modifying information or to relocate images based on such intermediate codes than to perform such processing based on the input image data.

Incidentally, the end shape is not considered in the example of FIG. 14. However, the contour may be defined taking the end shape into consideration, and based on the thus defined contour the horizontal segments are established.

As supposed from the explanation with reference to FIGS. 13 and 14, the intermediate codes have a data format as shown in FIG. 15. That is, the intermediate codes are defined by plural sets of a band number 161, the number of segments (DLs) 162 contained in the band, and four coordinate point data 163 of each segment which appear in series by the number of the bands. Based on the intermediate codes, corresponding raster data can easily be produced in a band-by-band manner.

Next, an explanation will be given of the structure of the pre-intermediate codes as image data having the second data format.

Figure 4:
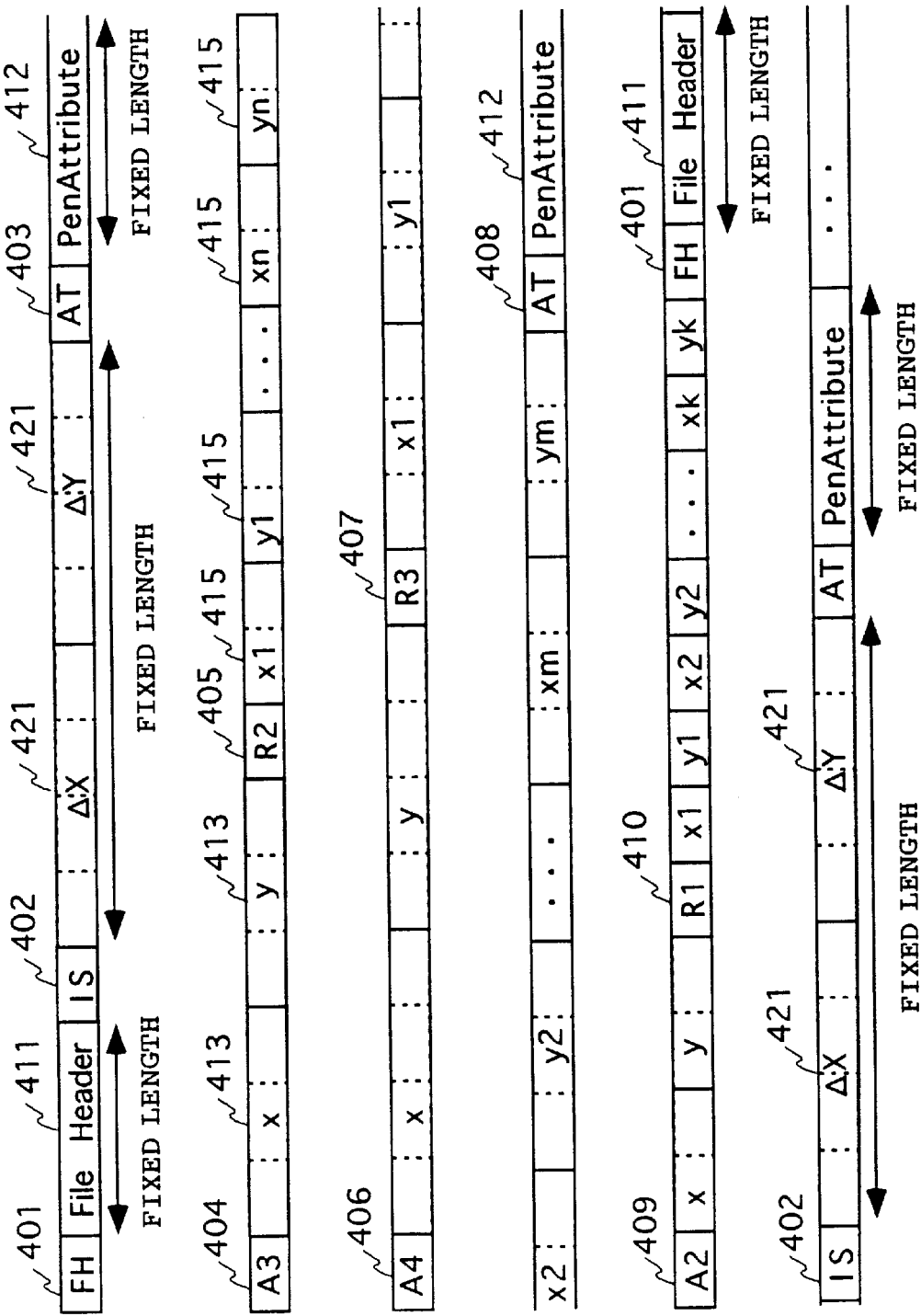
FIG. 4 shows a format of pre-intermediate codes which are used for the plotter apparatus of the embodiment.
Figure 8:
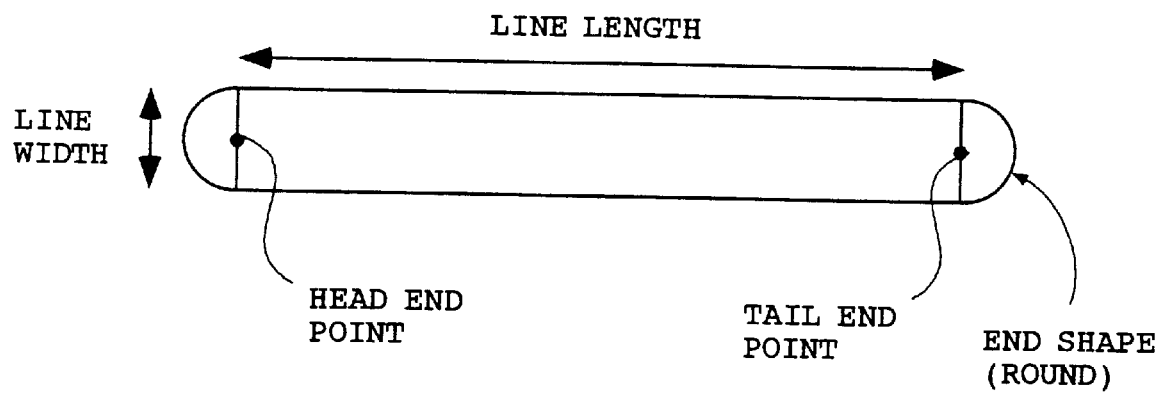
FIG. 8 is a diagram for illustrating general vector data.
Figure 9:
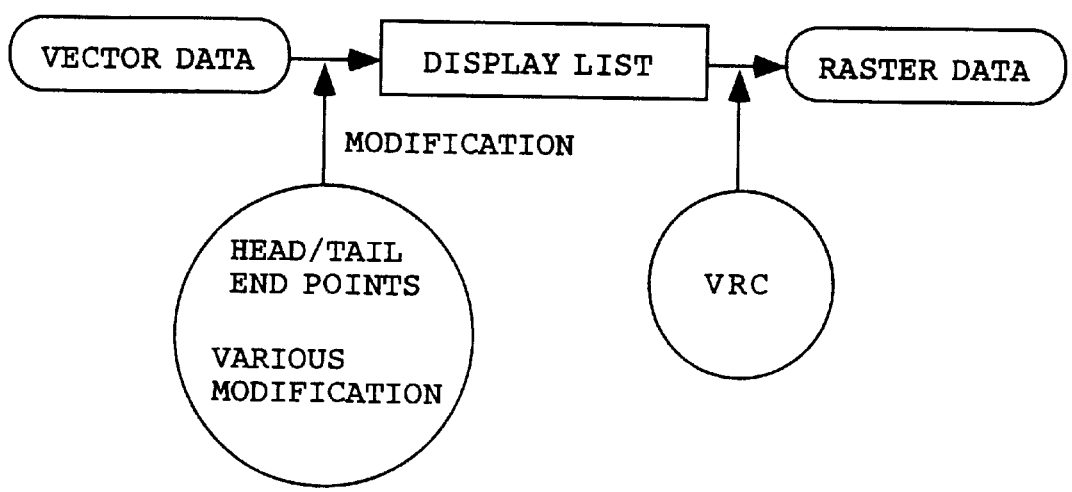
FIG. 9 conceptually shows a conversion procedure in which the vector data are converted into the raster data for a prior art raster-type plotter apparatus using a banding processing.

As shown in FIG. 4, the pre-intermediate codes comprise a data block called "file" which is a unit to be plotted. Generally, such a file corresponds to one page of image. Each file comprises various index data, image size data, modification data, and coordinate data. Since a fixed length of data and a variable length of data are mixed in a file, each data item is added at its head with a fixed length (1 byte for this example) of index data as an identifier which indicates what kind of data it is.

In the example shown in FIG. 4, index data 401 labeled "FH" show that the subsequent data are a file header 411 of a fixed length. Index data 402 labeled "IS" show that the subsequent data are integer data of 8 bytes which indicate an image size. Index data 403 labeled "AT" show that the subsequent data 412 are a pen attribute data of a fixed length. Index data 404 labeled "A3" show that the subsequent data 413 are absolute coordinate data of three byte integer (or integers). Index data 405 labeled "R2" show that the subsequent data 415 are relative coordinate data of two byte integer (or integers). Index data 406 labeled "A4" show that the subsequent data are absolute coordinate data of four byte integer (or integers). Index data 407 labeled "R3" show that the subsequent data are relative coordinate data of three byte integer (or integers). Thus, the letter "A" or "R" at the head of the index data 404–410 for indicating coordinate data denotes either absolute coordinate or relative coordinate and the subsequent number denotes the number of bytes of the coordinate data.

The file header 411 is an area of a fixed length for storing therein a file number which is automatically added to the image data when the pre-intermediate codes are produced, or an arbitrary file name which is entered by a user.

The image size data 421 indicate horizontal and vertical sizes ΔX and ΔY of the outline of an image of a file on a virtual paper sheet. This image size data are calculated when the pre-intermediate codes are produced from the input image data by:

ΔX=(maximum X)−(minimum X)

ΔY=(maximum Y)−(minimum Y)

Figure 20:
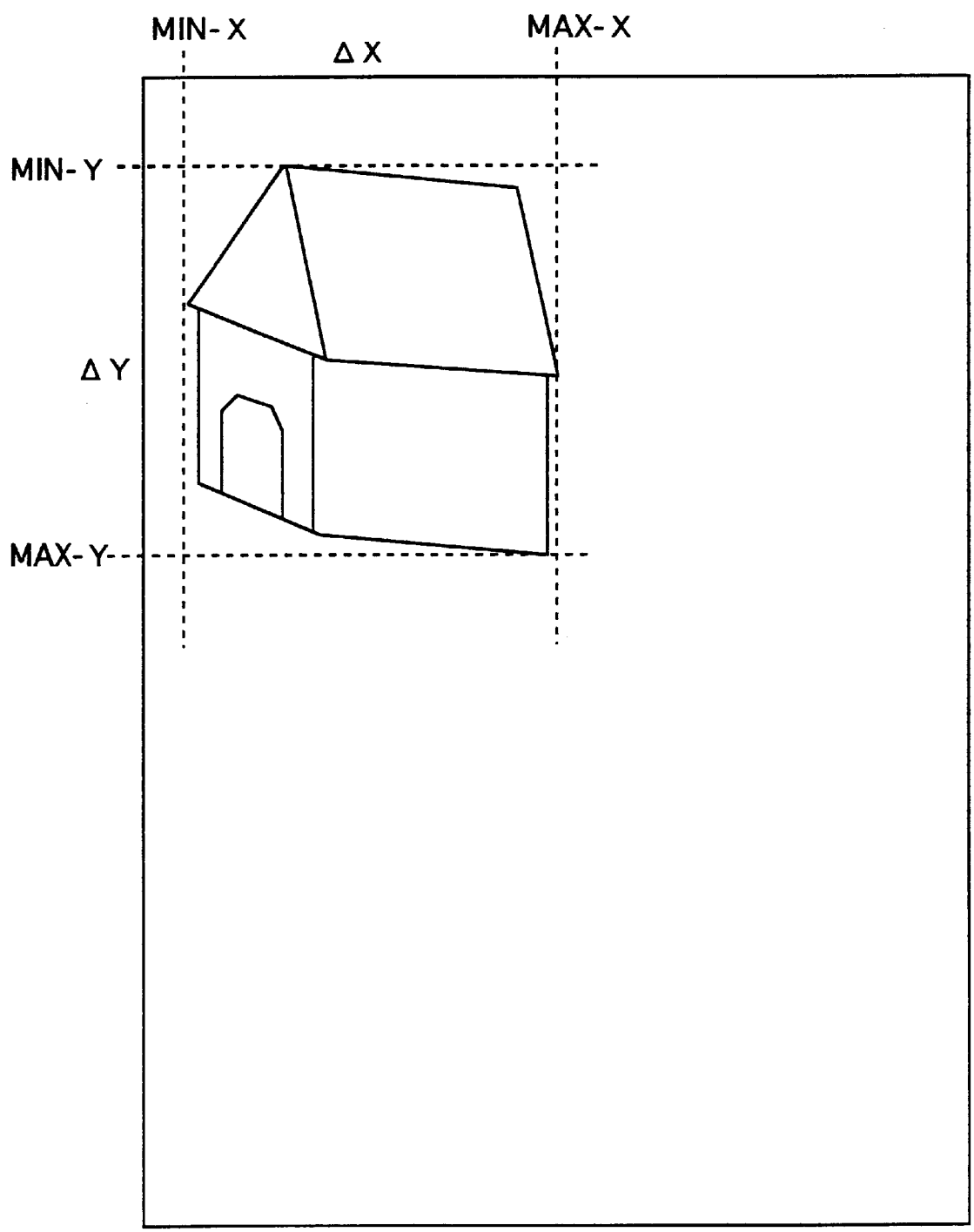
FIG. 20 is a diagram for illustrating an image size contained in the pre-intermediate codes of FIG. 4.

As seen from FIG. 20, the maximum X and the minimum X are maximum and minimum coordinate values, respectively, in the horizontal direction among the X coordinate values of pixels which constitute the image. The same applies to the Y axis. In this example, ΔX and ΔY are each represented by a fixed length, or four byte (32 bit) of data with no sign.

Figures 10, 11:
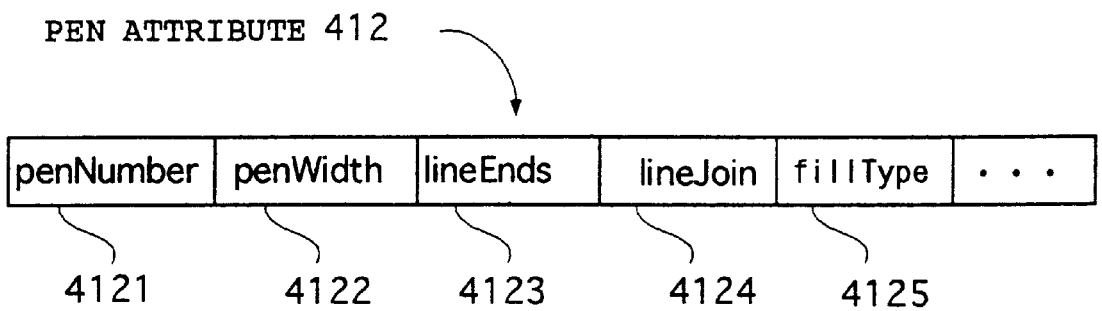
FIG. 10 illustrates a pen attribute for the format of the pre-intermediate codes shown in FIG. 4.
FIG. 11 illustrates various variable names of the pen attribute shown in FIG. 10.

The pen attribute 412 is a fixed length of area for storing various modifying information. Specific examples of the modifying information are shown in FIG. 10. The pen attribute 412 shown in FIG. 10 includes a pen number (penNumber) 4121 used for the vectors defined by the subsequent coordinate data, a pen width (penwidth) 4122, a line end type (lineEnds) 4123 for setting up the shape of the ends of a line segment, a line join type (lineJoin) 4124 for setting the shape of a join between the ends of line segments, and a fill type (fillType) 4125 for setting up a pattern to fill the inner area of the contour of the line segment.

As shown in FIG. 11, according to the present embodiment, the pen number 4121 is a value within 0–63, represented by 6 bit data. The pen width 4122 is represented by 32 bit data. The line end type 4123 and join type 4124 each are a value within 0–4 represented by 3 bit data. The fill type 4125 is a value within 0–396, represented by 9 bit data. However, it should be noted that the present invention is not limited to these specific values.

Figure 12A:
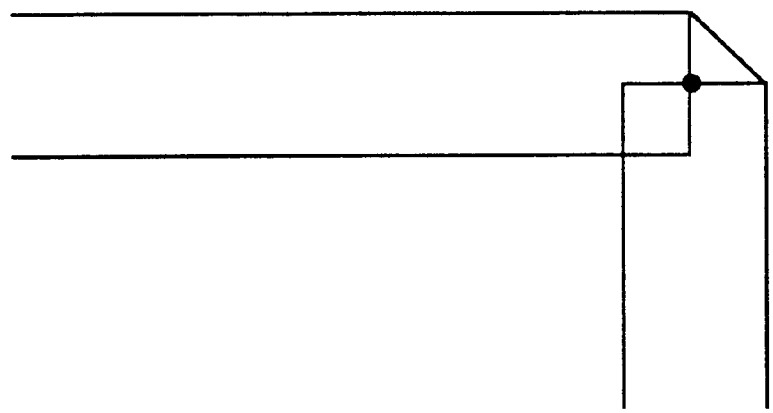
FIGS. 12(a), (b) and (c) illustrate joint types of line segments shown in FIG. 11.
Figure 12B:
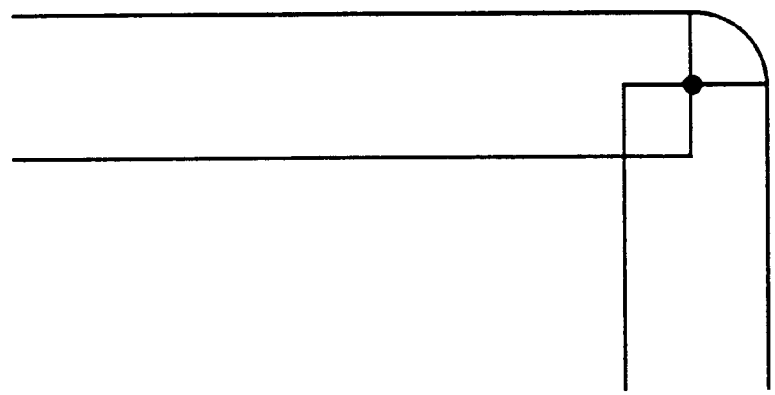
Figure 12C:
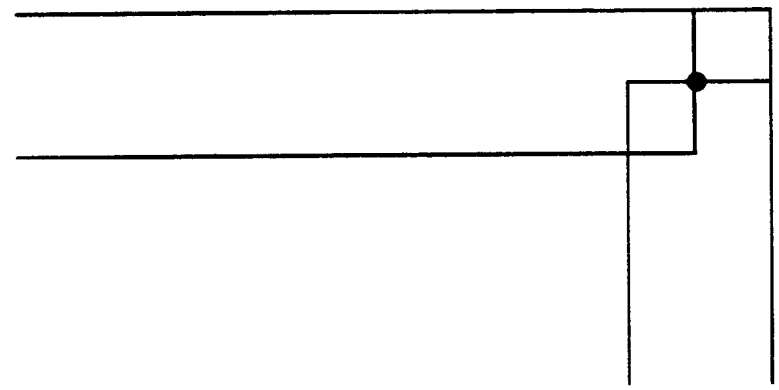

Three examples of the join type 4124 are shown in FIGS. 12(a)–(c). FIG. (a) shows a type in which outer vertices of vector contours are joined by a straight line, FIG. (b) shows a type in which the outer vertices are joined by an arc, and FIG. (c) shows a type in which outer sides of the contour lines of two vectors to be joined are extended.

As shown in FIG. 4, the pen attribute data 412 and coordinate data (x, y) 413, etc. are independently mixed with each other in the data of the pre-intermediate codes. When a plurality of vectors of the same pen attribute consecutively appear, the pen attribute data 412 is omitted except for the first one for that sequence of data. This is based on the fact that vectors are generally the elements constituting a circle, a polygon, or consecutive line segments, and hence, a lot of vectors of the same pen attribute will appear consecutively in the data.

Also, the consecutive vectors (i.e., a group of "n" vectors in which the tail end of i-th vector coincides with the head end of (i+1)-th vector (where i=1, 2, . . . , n−1) are represented by a series of points, wherein only one point of coordinate data is held for the coincident coordinate points (the tail end of i-th vector=the head end of (i+1)-th vector). For such consecutive vectors, the head end point of the first vector is represented by an absolute coordinate data, and the following end points are represented by relative coordinates with respect to the respective preceding end point. Considering the example shown in FIG. 18, the head end point 181 of the first vector 191 of the consecutive vectors 191 and 192 is represented by an absolute coordinate, while other end points 182 and 183 are represented by relative coordinates with respect to the preceding end point. Similarly, for the consecutive vector 193 and 194, the head end point 184 of the first vector 193 is represented by absolute coordinates, while other end points 185 and 186 are represented by relative coordinates with respect to the respective preceding point. Not drawn in detail, a predetermined polygon is substituted for the circle 195, so that the sides of the polygon are handled as the same as the consecutive vectors. Incidentally, relative coordinates could be larger in absolute value than absolute coordinates. However, in the present embodiment, the end points of vectors other than the head end point of the first vector are uniformly defined by the relative coordinate. This is because it is expected with respect to general images that relative coordinates are smaller in absolute value than absolute coordinates.

In the example shown in FIG. 4, the index data 402 is provided dedicatedly for the image size data 421. Alternatively, the image size data 421 may be included in the file header 411.

The above-explained structure of the pre-intermediate codes allows image data to be compressed.

The omission of the pen attribute data is applied not only to the vectors of a set of consecutive vectors but also to plural sets of consecutive vectors. That is, when a set of consecutive vectors have the same pen attribute as the preceding set of consecutive vectors, the pen attribute data for the succeeding set of consecutive vectors can be omitted. When the pen attribute changes at the middle of continuous vectors, a new pen attribute is inserted thereinto to quit the sequence of the points, so that the subsequent vectors are handled as another set of consecutive vectors. These features also serve to reduce the data amount necessary for the pre-intermediate codes.

The coordinate data of the pre-intermediate codes are a variable length of data. For example, if a coordinate value is sufficiently represented by "n" byte integer ($1 \leq n \leq 3$), then such a coordinate is represented by "n" byte integer data. This data structure also contributes to the data compression of the pre-intermediate codes.

Referring now to FIG. 5, an explanation will be given of the structure of coordinate data and index data which constitute the pre-intermediate codes according to the present embodiment.

As mentioned above, in the present plotter apparatus each index uses one byte separately so that the index data is added to the file header, the pen attribute data, and coordinate data at their head. When a plurality of coordinate data of the same number of coordinate data successively appear, the index data for the second and later bytes are omitted. The file header or pen attribute data following the index data is always single and of a fixed length.

As shown in FIG. 5, in order to distinguish one-byte index data from the most significant byte of coordinate data, the most significant bit (LSB) of the byte is used for that purpose. That is, when one byte is taken out from pre-intermediate codes, the LSB being ON (or "1") indicates that the data is index data and the LSB being OFF (or "0") indicates that the data is the most significant byte of coordinate data. Of course, there is no such restriction to the MSB of the second and the following bytes in the data of two bytes or more.

Thus, the MSB of the most significant byte of coordinate data is not available for a sign bit for distinguishing from index data, and hence, n-byte integer becomes actually (n×8−1)-bit integer. Then, the integer more than 31 bits will not be represented by a 1–4 byte integer only. For this reason, 5-byte integer is prepared as shown in FIG. 6 for the integer data which can not be represented only with 32 bits.

Figure 19A:
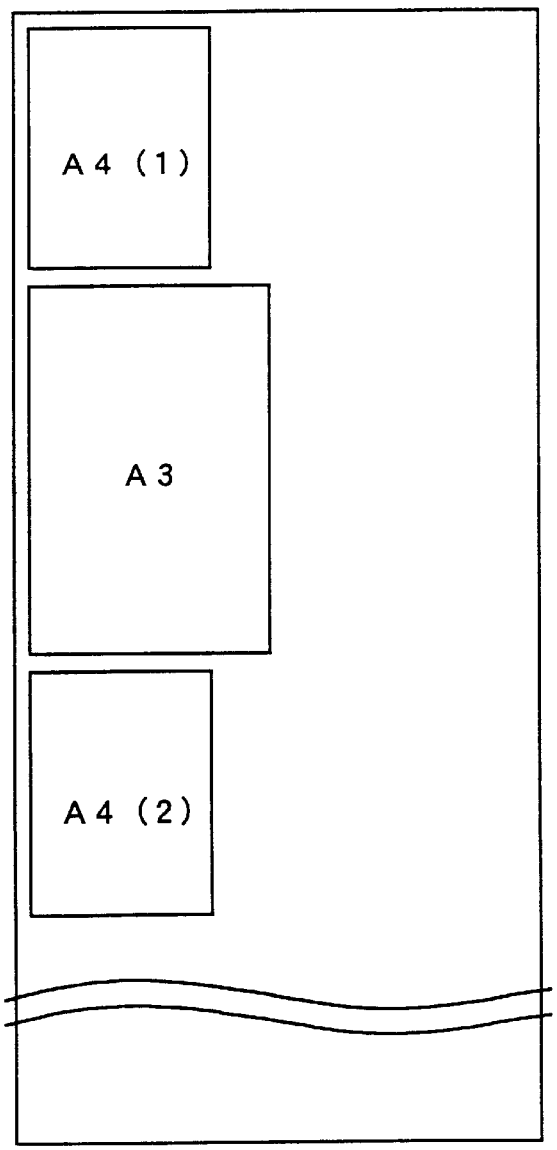
FIGS. 19(a) and (b) are diagrams for illustrating relocation of images in the embodiment.
Figure 19B:
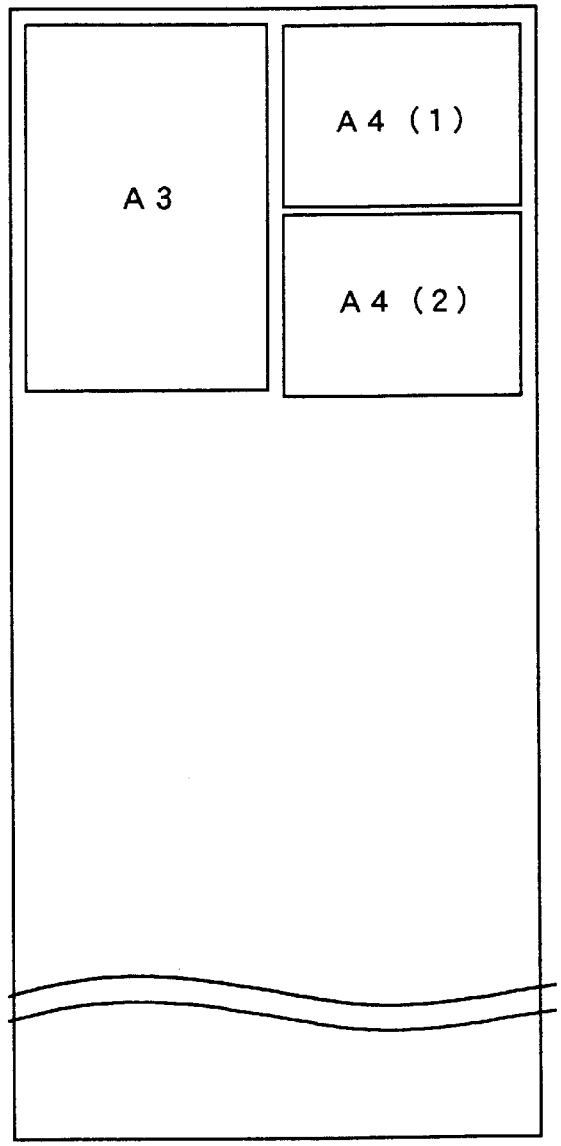

The absolute coordinate used in the second data format is the absolute coordinate on a sufficiently large virtual paper sheet, and is converted into the coordinate of an actual print position on an actual paper sheet during the conversion into the intermediate codes. Thus, by finally determining coordinates during the pre-intermediate/intermediate code conversion, it is possible to change the print position freely even after the reception of input image data is completed. Therefore, in a relocation processing or the like, it is possible to relocate and print with a higher degree of freedom than prior art. The relocation processing is performed generally when the lengthy paper such as the roll paper is used. According to the present embodiment, a user can issues an instruction from the operation panel to perform the relocation for saving paper. Responsive to the instruction, the data analyzer unit 3 relocates the image printed as shown in FIG. 19(a) to the image printed as shown in FIG. 19(b), based on the pre-intermediate codes. More specifically, regarding the position information, the intermediate codes are produced by the addition of the amount for an origin movement (offset) to the coordinate values in the pre-intermediate codes. When a rotation is necessary, a rotation processing is performed.

Now, an explanation will be given of enlargement/reduction and rotation processing of an image to be plotted according to the present embodiment, which are performed based on the above-mentioned image size data in the pre-intermediate codes.

According to the present embodiment, for example, even when an actual paper size given from the print engine 26 is changed after the pre-intermediate codes are produced, it is possible to enlarge/reduce the image so as to fit it to the actual paper size. More specifically, it is possible to form a size of image suitable for the actual paper sheet by multiplying the coordinate values in the pre-intermediate codes by the ratio between the image size given from the pre-intermediate codes and the actual paper size in producing the intermediate codes. Also, the smallest typical paper size, which can contain the image size given in the pre-intermediate codes, replaces the image size as a new image size, and the ratio between the new image size and the actual paper size may be used to thereby the vertical/horizontal ratio of the image to be plotted can be maintained. Alternatively, in order to maintain the vertical/horizontal ratio of the image, such ratio only in one X or Y coordinate value may be used so as to apply the ratio to the other.

The rotation of an image may automatically be performed when relocating the image, as well as in response to a user's instruction. In the automatic case, the orientation of the image (Portrait/Landscape) is known from the image size data in the pre-intermediate codes, and hence, even when the user sets up the paper orientation in a wrong way, it is possible, when converting the pre-intermediate codes into the intermediate codes, to automatically perform the rotation processing to produce the intermediate codes. This rotation processing is realized by using the following formula for the linear transformation of the coordinate values in the pre-intermediate codes.

$$x' = x \cdot \cos\theta - y \cdot \sin\theta$$
$$y' = y \cdot \sin\theta - x \cdot \cos\theta$$

where, (x, y) indicates coordinates before the conversion and (x', y') indicate coordinates after the conversion. Generally, "θ" is the angle of the rotation, and +90 degrees or −90 degrees in the case of relocation.

FIG. 7 shows an embodiment in which the integer data shown in FIG. 6 are converted into the corresponding pre-intermediate codes. As seen from FIG. 7, when the CPU is of a type corresponding to the little-endian, the byte order of the integer data becomes opposite to each other between in a normal memory and in the pre-intermediate codes.

In the above-described embodiment, a display unit 8 is a monitor apparatus so that the monitor apparatus is used to layout-display images to be actually plotted, to check the images so as to change the modifying information. Alternatively, a small liquid crystal display device may be provided as the display unit 8 so that only the modifying information is displayed to change the modifying information. This allows the display unit 8 to be reduced in size, also reducing the plotter apparatus in size and cost.

The image processor according to the present invention is also applicable to any device other than the plotter apparatus if the device employs the banding processing. Further, it will be understood by those skilled in the art that various changes and modification can be made without departing from the spirit and scope of the present invention.

The image processor according to the present invention employs the banding processing, and hence, it is possible to convert input image data into raster data without providing a memory of a large storage capacity. Moreover, pre-intermediate codes with unsettled modifying information are produced and stored in a storage means, which allows changes of the modifying information prior to the plotting, without providing an input buffer memory of a large storage capacity. Consequently, the capacities of the various memories are reduced, making it possible to manufacture the image processor at a low cost.

In addition, the alteration of the modifying information can be performed with respect to the pre-intermediate codes, and hence, it is possible to analyze the input image data even when the paper size actually set is unknown in advance, by setting up beforehand a virtual paper size in plot/layout, which size is expected to be larger than the actual paper size.

Furthermore, when a possibility for data to be transmitted successively is high as in the case of, for example, laying out images (particularly, when using roll paper as the plot paper) or using a cut sheet feeder, even if the paper size actually set is changed, it is possible to analyze the input image data beforehand, based on the pre-intermediate codes by using the time during which the CPU load is not high. Thus, the CPU is efficiently used.

INDUSTRIAL APPLICABILITY

The present invention can be used in designing and manufacturing plotter and printer apparatuses and the like which perform a printing by converting vector data into raster data for respective regions of an image.

What is claimed is:

1. An image processor for forming an image in a band-by-band manner, comprising:

a data format conversion means for converting input image data of a first data format into image data of a second data format, said input data of the first data format including coordinate data of end points of respective vectors constituting an image and various modifying information which contains at least a line width, and the second data format holding said various modifying information, which contains said at least a line width, still independently of said coordinate data of end points and reducing data amount compared to said first data format;

a storage means for storing an entirety of said image data of the second data format obtained by said data format conversion means;

an intermediate code production means for producing intermediate codes of a third data format, which include coordinate data constituting contours of the respective vectors on which said various modifying information has been reflected, in the band-by-band manner based on said image data of the second data format; and a raster data production means for converting, in the band-by-band manner, said intermediate codes of the third data format into corresponding raster data of a fourth data format.

2. The image processor according to claim 1, wherein in said second data format, a group of vectors connected in series are defined by coordinate data of the end points of the vectors, and wherein only a head end point of the first one of the vectors is represented by absolute coordinates while the rest of the end points of the vectors are represented by relative coordinates.

3. The image processor according to claim 2, wherein the coordinate data of said second data format is data of variable length, the coordinate data of each coordinate point being added, at a head thereof, with index data of a fixed length which indicate a data length of the coordinate data and whether the coordinate is absolute or relative coordinate.

4. The image processor according to claim 3, wherein when a plurality of coordinate data of a same type successively appear, said index data are omitted with respect to a second and the following coordinate data of the plurality of coordinate data.

5. The image processor according to claim 3, wherein in said second data format, said coordinate data and said index data are distinguished from each other by a head bit of unit data of a predetermined plurality of bits.

6. The image processor according to claim 3, wherein in said second data format, said various modifying information include pen attribute data of a fixed length, at the head of which another index data of a fixed length is added for distinguishing the same.

7. The image processor according to claim 6, wherein in said second data format, said pen attribute data is added only to the coordinate data of a vector whose modifying information are different from that of a previous vector.

8. The image processor according to claim 1, wherein values of the coordinate data of said first data format are represented by character data.

9. The image processor according to claim 1, wherein said intermediate codes include, for each band, a band number, the number of horizontal segments of a contour of each vector, and coordinate data of each of the horizontal segments.

10. The image processor according to claim 1, wherein said intermediate code production means comprises means for using a user-specified modifying information in preference to said various modifying information in the image data of said second data format, according to a user's instruction, when producing said intermediate codes on the basis of the image data of said second data format.

11. The image processor according to claim 1, further comprising means for changing a piece of modifying information specified by a user among said various modifying information placed in the image data of said second data format which are stored in said storage means.

12. The image processor according to claim 1, further comprising means for determining positions and orientations of a plurality of images on a paper sheet, when said intermediate code production means produce said intermediate codes on the basis of the image data of said second data format.

13. The image processor according to claim 12, wherein said data format conversion means detect the size of an input image, based on said input image data, to put image size data indicating the detected size into the image data of said second data format, and wherein said means for determining positions and orientations determining the positions and orientations determine the positions and orientations in reference to said image size data.

14. The image processor according to claim 1, further comprising means for enlarging/reducing an image, when said intermediate code production means produce said intermediate codes on the basis of the image data of said second data format.

* * * * *